United States Patent [19]
Cook et al.

[11] Patent Number: 5,480,476
[45] Date of Patent: Jan. 2, 1996

[54] ACTIVATED POLISHING COMPOSITIONS

[75] Inventors: Lee M. Cook, Steelville; Scott B. Loncki, Lincoln University, both of Pa.; Gregory Brancaleoni, Newark, Del.

[73] Assignee: Rodel, Inc., Newark, Del.

[21] Appl. No.: 301,558

[22] Filed: Sep. 6, 1994

Related U.S. Application Data

[62] Division of Ser. No. 116,322, Sep. 3, 1993, Pat. No. 5,382,272.

[51] Int. Cl.$^6$ .................................................... C09G 1/02
[52] U.S. Cl. .................................. 106/3; 51/295; 51/308; 51/309; 437/946
[58] Field of Search ............................ 51/293, 295, 308, 51/309; 106/3; 252/79.1, 79.5; 437/946

[56] References Cited

U.S. PATENT DOCUMENTS

| | | | |
|---|---|---|---|
| 2,892,797 | 6/1959 | Alexander et al. | 252/313 |
| 3,262,766 | 7/1966 | Nonamaker | 51/308 |
| 3,301,646 | 1/1967 | Smoot | 51/309 |
| 3,768,989 | 10/1973 | Goetzinger et al. | 51/309 |
| 3,922,393 | 11/1975 | Sears, Jr. | 427/215 |
| 4,169,337 | 10/1979 | Payne | 51/283 R |
| 4,384,038 | 5/1983 | Khoe et al. | 427/163 |
| 4,769,046 | 9/1988 | Senda et al. | 51/293 |
| 5,228,886 | 7/1993 | Zipperian | 51/293 |
| 5,382,272 | 1/1995 | Cook et al. | 51/293 |

OTHER PUBLICATIONS

Silvernail and Goetzinger, "Mechanism of Glass Polishing" Glass Industry, vol. 52, 1971, pp. 172–175.
Shlishevskii And Migoskina, "Acceleration of Glass Polishing Processing with Chemical Reagents," Sov. J. Opt. Tech., vol. 44, 1977, pp. 680–681.
Iler, The Chemistry of Silica, Wiley–Interscience, NYC, 1979, pp. 667–676.

*Primary Examiner*—Deborah Jones
*Attorney, Agent, or Firm*—Kenneth A. Benson

[57] ABSTRACT

Disclosed is a process for preparing activated compositions and the compositions derived therefrom which are suitable for polishing surfaces, particularly integrated circuits, wherein a base abrasive is activated by addition of a second cation whose oxide exhibits a higher polishing rate than the base abrasive alone. The activation is effected by chemical adsorption of the activating cation onto the base abrasive during cyclic impact in an aqueous medium whose pH is at a level which is favorable for adsorption of the activating cation onto the base abrasive surface.

8 Claims, 1 Drawing Sheet

ACTIVATED POLISHING COMPOSITIONS

This is a division of application Ser. No. 08/116,322 filed Sep. 3, 1993, now U.S. Pat. No. 5,382,272.

BACKGROUND OF THE INVENTION

1. Field of the Invention

This invention relates generally to the polishing of glasses, semiconductors, and integrated circuits. More particularly, this invention relates to the surface preparation of articles wherein a more rapid rate of polishing is desired.

2. Description of the Prior Art

Polishing solutions, or slurries generally consist of a solution which contains a concentration of abrasive particles. The part, or substrate, is bathed or rinsed in the slurry in conjunction with an elastomeric pad which is pressed against the substrate and rotated such that the slurry particles are pressed against the substrate under load. The lateral motion of the pad causes the slurry particles to move across the substrate surface, resulting in wear, volumetric removal of the substrate surface.

The rate of surface removal (polishing rate) is largely determined by the magnitude of the applied pressure, the velocity of pad rotation and the chemical activity of the abrasive particle. While virtually any particle of sufficiently small size may be used for polishing, economically useful high polishing rates are exhibited by a relatively small number of compounds. For most substrates (e.g., $SiO_2$ or silicates) the highest rates are found for formulations composed primarily of $CeO_2$ or $ZrO_2$. In consequence, there is a large body of prior art describing the composition and preparation of polishing slurries based on these two oxides.

Extensive efforts have been made to develop additives which accelerate the rate of polishing in order to make the polishing process more economical. Such accelerants may be generally classified as etchants, which would by themselves dissolve the substrate, or polishing compound accelerants, which increase rates when added to the abrasive itself. Etchant accelerants, such as described in U.S. Pat. No. 4,169,337 are commonly employed in conjunction with $SiO_2$ abrasives to polish silicon wafers. These additives can be classified into two categories; (1) additives that increase or buffer the solution pH (e.g. organic amines), or (2) organic compounds, generally amines, that may additionally increase the Si corrosion rate by complexing or sequestering Si (e.g., ethylene diamine or piperazine). These classes of etchant accelerants are distinctly different than the accelerants employed in the present invention.

A variety of polishing compound accelerants have been described. They can be classified into two main categories; (1) Additives which are coprecipitated with the base abrasive prior to calcination, and (2) water soluble additives to the final polishing slurry. Examples of prior art belonging to the first category are found in U.S. Pat. No. 3,262,766 (Nonamaker), U.S. Pat. No. 3,768,989 (Goetzinger and Silvernail) and U.S. Pat. No. 3,301,646 (Smoot). These examples are important, as they illustrate the primary prior art pathways for coprecipitating activating substances.

Nonamaker teaches the incorporation of small amounts of $SiO_2$ (<5%) to a mixture consisting primarily of rare earth oxides (including $CeO_2$) prior to calcination in order to accelerate polishing rates in the final calcined product. The precise mechanism of this effect is not understood.

In a similar fashion, Goetzinger and Silvernail taught coprecipitation of rare earth carbonates, primarily cerium carbonate, together with Wollastonite (calcium metasilicate). The co-precipitate was subsequently calcined to yield an activated final product. Once again, the precise mechanism of the activation was not disclosed.

Smoot taught the deliberate incorporation of Calcium or other divalent ions (e.g., $Mg^{2+}$) into zirconium oxide to produce calcium-stabilized cubic zirconium oxide, a material which is widely used as a structural ceramic. The process consisted of dry batch mixing of $ZrO_2$ and the stabilizing compound, typically $CaCO_3$, followed by calcination of the mixture at elevated temperature (~2100° F.) to form a cubic $ZrO_2$ product. The stabilized cubic zirconia was found to have an accelerated polishing rate relative to the normal monoclinic phase of zirconia obtained without addition of the calcium accelerant.

The second pathway for activation is the activation of slurries by addition of water soluble additives to the final solution: As reviewed by Silvernail ("Mechanism of Glass Polishing", Glass Industry, vol. 52, pp. 172–5, 1971), addition of $Ce(OH)_4$ to polishing slurries can produce significantly increased polishing rates. In particular, some previously inactive oxides, such as $Tb_4O_7$ showed high polishing rates after $Ce(OH)_4$ addition. Other compounds have also been used as accelerants. Shlishevskii and Migus'kina (Sov. J. Opt. Technol., vol. 44, pp. 680–1, 1977) demonstrated as much as 2× improvement in polishing rate when 2% ammonium molybdate, 1% Mohr's salt $(NH_4)SO_4 \cdot FeSO_4$, or 1% zinc sulphate was added to a $CeO_2$-based polishing slurry. The basis of the effect was ascribed to complexation of silicate reaction products with the additive compounds so as to prevent their redeposition back onto the substrate surface.

The prior art methods for enhancing polishing activity suffer from a number of deficiencies. First, while etchant additives may increase the overall rate of surface removal of the substrate, their action is isotropic, i.e., they attack all portions of the exposed substrate surface regardless of position. This leads to significantly degraded surface roughness and texture in the polished substrate. Their incorporation is therefore generally considered to be undesirable for slurries used to prepare high quality surfaces (i.e. final polishing). This is particularly true for the polishing of Si wafers.

As regards polishing compound additives, the principal deficiency of adding additives prior to calcination is that rates cannot be adjusted subsequent to formation of the final polishing compound. An additional deficiency is that the technique cannot readily be applied to some polishing abrasives of technical importance, particularly $SiO_2$, which is commonly used for Si wafer and integrated circuit polishing. Solution additives, such as $Ce(OH)_4$, have not given consistent activation and cannot be used with $SiO_2$-based polishing slurries due to gelation.

Yet another obvious way of increasing the polishing rate of a slurry with low rate (e.g. $SiO_2$) would be to simply add to it a portion of another slurry (e.g., $CeO_2$). While this has not been the subject of prior art disclosures, it is a common practice in the polishing art. This technique suffers from two deficiencies. First, the rate of increase is linearly proportional to the amount of the second slurry added. Thus, to achieve a substantial amount of acceleration, a significant fraction of the second material must be added. Second and more critical, addition of the second slurry changes the particle size distribution of the original slurry unless the two particle size distributions are precisely matched. While this may be possible, it is generally not economically feasible. This is particularly true in the case of colloidal silica slurries such as are used in Si wafer polishing. These slurries have extremely small particle sizes, typically 50–100 nm. In contrast, all known commercial $CeO_2$-based slurries have mean particle diameters in excess of 1000 nm. Incorporation of such larger particles would have a catastrophic effect on the quality of the Si wafer surfaces produced after polishing.

From the above, it is clear that an additive which could increase polishing rams without increasing the static corrosion of the substrate, which could be applied to a variety of abrasive types, particularly $SiO_2$, subsequent to particle formation, and which could be applied without alteration of the original slurry particle size would be a significant improvement over prior art.

Accordingly, it is the object of this invention to provide an improved means of increasing the polishing rate of slurries without increasing the overall corrosiveness of the polishing solution, which can be easily applied to a variety of abrasive particles, particularly $SiO_2$, and which can be employed in a manner which does not alter the original particle size.

It is also an object of this invention to provide polishing slurries with significantly improved performance which are prepared by said means.

These and other objects of the invention will become apparent to those skilled in the art after referring to the following description and examples.

SUMMARY OF THE INVENTION

The object of this invention has bean achieved by providing a process for preparing compositions suitable for polishing surfaces, particularly integrated circuits, wherein the base abrasive, e.g., $SiO_2$, is activated by addition of a second cation, whose oxide exhibits a higher polishing rate than the base abrasive alone. The activation is effected by chemical adsorption of the activating cation onto the base abrasive. This adsorption is accomplished by co-milling the base abrasive and small amounts of an activating oxide in an aqueous medium whose pH is at a level which is favorable for adsorption of the activating cation onto the base abrasive surface. Alternatively, one may employ milling abrasives which themselves are made from or contain said activating cation under the same solution conditions to obtain the same result.

DESCRIPTION OF THE INVENTION

Figure 1:
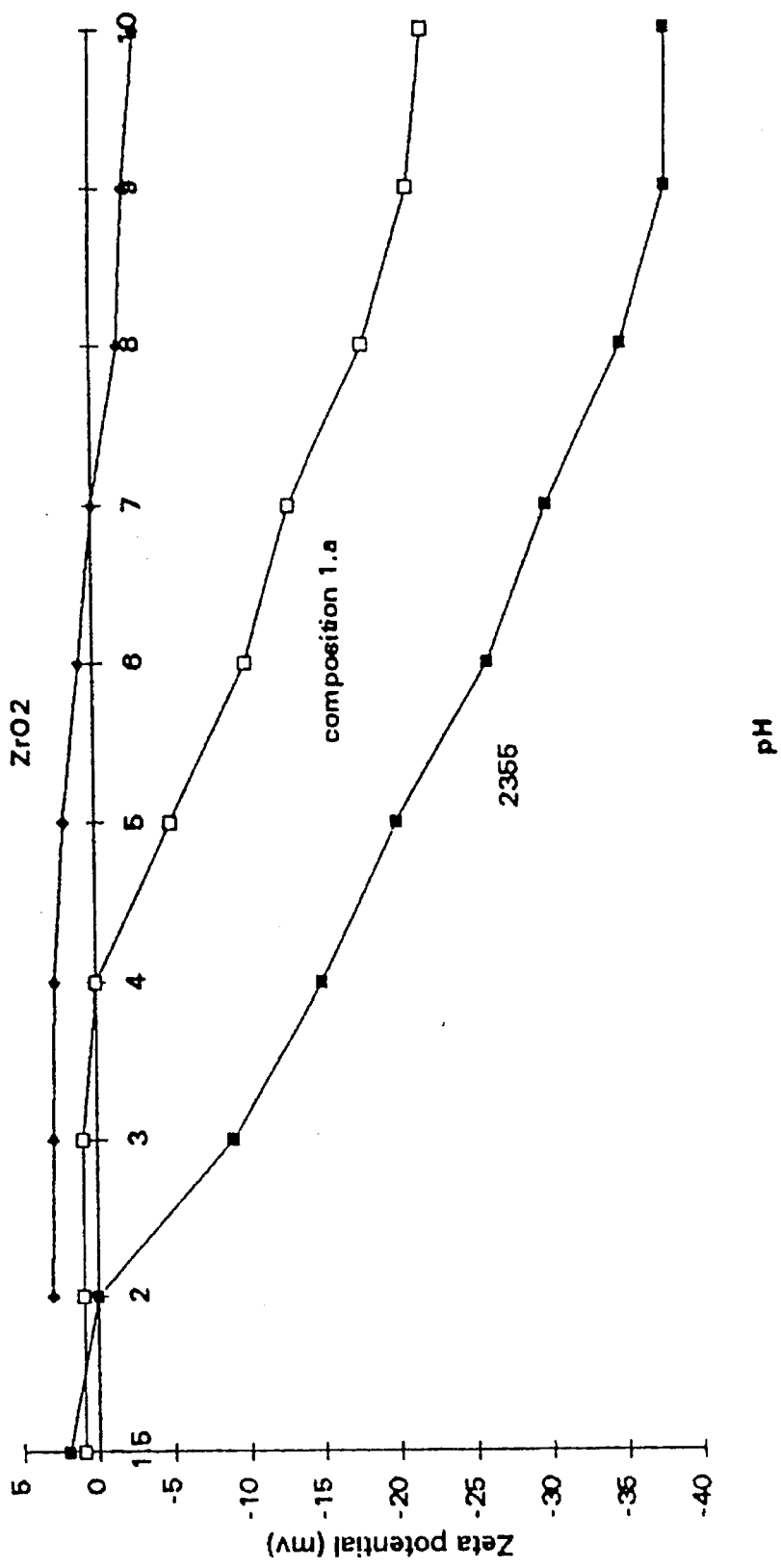
FIG. 1 shows a property of a composition of this invention as compared to an untreated composition.

This method of preparation differs substantially from prior art activation processes in that it is applicable to a variety of base abrasive particles, providing that certain minimum conditions for adsorption are met, no subsequent thermal processing of the abrasive is required, and, when the i milling abrasives are used as the source of the activating cation, no foreign particles are added to the slurry which might negatively change the particle size distribution. Additionally, as will be shown in subsequent examples, only small quantities of activating cations are required for a substantial acceleration of polishing rate. This makes the technique of the present invention clearly different from the case of a simple addition of a second more active abrasive component.

The basis for the effect is transfer of active cations to the surface of the base abrasive by cyclic impact with a solid source of said active cation. As a consequence of this adsorption, the abrasive particle takes on the surface characteristics of the activating ion itself. Thus a $SiO_2$ particle treated with a $ZrO_2$ source will exhibit surface charge characteristics similar to that of a $ZrO_2$ particle. During polishing, the particle will, therefore, exhibit rates characteristic of a $ZrO_2$ abrasive rather than a $SiO_2$ abrasive.

While there is extensive prior art technology existing for changing surface charge of solid or particulate surfaces by adsorption of a second cation (e.g. $Al^{3+}$ on $SiO_2$, see R. Iler, The Chemistry of Silica, Wiley-Interscience, N.Y.C, 1979, pp. 667–76) it has been exclusively effected by adsorption from solution. In sharp contrast, the proposed mechanism for the present invention is that interparticle bonds are momentarily formed and broken during the impact process, resulting in retention of a surface concentration of activating cations on the base particle surface.

When said cyclic impacts are performed under solution conditions favorable to adsorption of the activating cation of interest onto the base abrasive surface, retention of the activating ion may be enhanced. The recognition of the importance of controlling the solution pH to stabilize retention of activating cations onto the base abrasive is a key factor in the success of the present invention. For each combination of activating cation and base abrasive there will be a specific pH range which is optimal. This may be relatively narrow or quite broad. For cations of practical interest, particularly $Zr^{4+}$, strong adsorption onto silica surfaces occurs over virtually the entire pH range, and precise control of pH during the milling process is of secondary importance. These cations are preferred, as it allows broader latitude in the manufacuring of activated silica polishing slurries.

Examples of polishing slurries prepared by the present invention are set forth below to illustrate the essential features and results. They are not meant to be restrictive in any way.

EXAMPLES

Example 1

A polishing slurry (composition 1.a) was prepared as follows. 30 kg of fumed silica was added to 70 kg. deionized water and blended using a high speed mixer until throughly dispersed. The mixture was then fed through an agitator mill which contained a zirconium silicate mill medium. The silica mixture was milled at a flow rate of 1.5 liter/min and passed to a second tank. After milling, sufficient water was added to dilute the milled product to 13% solids concentration, and ammonium hydroxide was added to adjust the final pH to 10.5. Chemical analysis of composition 1.a showed a $ZrO_2$ content of 1.4 ppm in the final composition. Measurements of the surface potential (zeta potential) were made using acoustophoresis to assess the surface charge of the milled particles relative to a high purity silica sol (2355) and a high purity $ZrO_2$ sol. As shown in FIG. 1, the zeta potential for composition 1.a was markedly different from that of a high purity silica sol (2355). The isoelectric pH, or pH at which the zeta potential was zero, was shifted markedly to higher pH (from 2.2 to 4). This value is intermediate between the silica and zirconia reference samples.

An equivalent slurry (composition 1.b) was prepared in the same manner but without milling. Chemical analysis of composition 1.b indicated no $ZrO_2$ present, confirming that the $ZrO_2$ observed in composition 1.a had originated from the zirconium silicate mill media.

Both compositions were then used to polish samples of thermally grown $SiO_2$ on Si substrates using a Strasbaugh model 6DS planarizer to assess polishing activity. Polishing conditions were 7 psi downforce, 20 rpm table speed, and 150 ml/min. slurry flow, and an IC1000 polishing pad, with dressing between sample runs. Composition 1.a gave a polishing rate of 1200 angstroms/min. In contrast, composition 1.b polished at only 600 angstroms/min, a two-fold difference.

Example 2

Four lots of slurry (hereinafter designated as compositions 2.a–2.d) were prepared in the same manner as composition 1.a of the previous example. Composition 2.a was identical to composition 1.a in every respect. Compositions 2.b, 2.c, and 2.d were made with 1%, 2 %, and 4% $CeO_2$ substitutions for $SiO_2$ respectively. The $CeO_2$ was added to the initial dispersion prior to milling.

Following slurry preparation, all compositions, as well as a portion of a commercially available silica based polishing compound (SC-112, manufactured by Cabot Corp.), were used to polish samples of thermally grown $SiO_2$ on Si substrates using a Strasbaugh model 6CA polishing machine for assessment of polishing activity. Polishing conditions were 7 psi downforce, 20 rpm table speed, and 150 ml/min. slurry flow, and an IC1000 polishing pad. No pad conditioning was employed. Average polishing rates are summarized below.

TABLE 1

| Sample | Polishing rate (angstroms/min) |
| --- | --- |
| SC-112 | 901 |
| Composition 2.a | 1184 |
| Composition 2.b | 1106 |
| Composition 2.c | 1658 |
| Composition 2.d | 1665 |

Composition 2.a gave a polishing rate equivalent to 1.a, as expected. A significant amount of additional activation was observed with $CeO_2$ additions. However, the activation was clearly non-linear; a threshold concentration of ~2% $CeO_2$ gave the most pronounced effect. Additional $CeO_2$ addition did not give further increase in rate (2.c vs. 2.d). This threshold activation effect is quite different from the linear effect expected from simple addition of $CeO_2$ to the slurry. Also, as was the case for example 1, the quantity of $CeO_2$ required for activation is substantially below levels normally used to obtain rate enhancement in simply blending two slurries.

We claim:

1. A composition suitable for polishing articles comprising a base abrasive activated by chemical adsorption of a cation whose oxide exhibits a higher polishing rate than said base abrasive alone onto the surface of said base abrasive, said adsorption being accomplished by subjecting said base abrasive and a compound containing said cation to cyclic impact in an aqueous medium whose pH is at level which is favorable for adsorption of said cation onto said base abrasive surface.

2. A composition suitable for polishing articles according to claim 1 wherein said base abrasive and said compound containing said cation are subjected to said cyclic impact by being co-milled.

3. A composition suitable for polishing articles according to claim 2 wherein said compound containing said cation is in milling abrasives which are used in the milling process.

4. A composition suitable for polishing articles according to claim 1, 2 or 3 wherein said base abrasive is $SiO_2$.

5. A composition suitable for polishing articles according to claim 1, 2 or 3 wherein said cation is $Ce^{4+}$.

6. A composition suitable for polishing articles according to claim 4 wherein said cation is $Ce^{4+}$.

7. A composition suitable for polishing articles according to claim 1, 2 or 3 wherein said cation is $Zr^{4+}$.

8. A composition suitable for polishing articles according to claim 4 wherein said cation is $Zr^{4+}$.

* * * * *